US012104413B2

(12) United States Patent
Despreaux

(10) Patent No.: US 12,104,413 B2
(45) Date of Patent: Oct. 1, 2024

(54) DOOR LEAF HANDLE FOR A MOTOR VEHICLE

(71) Applicant: U-Shin Italia S.p.A., Pianezza (IT)

(72) Inventor: Guillaume Despreaux, Pianezza (IT)

(73) Assignee: U-SHIN ITALIA S.P.A., Pianezza (IT)

( * ) Notice: Subject to any disclaimer, the term of this patent is extended or adjusted under 35 U.S.C. 154(b) by 330 days.

(21) Appl. No.: 16/923,356

(22) Filed: Jul. 8, 2020

(65) Prior Publication Data

US 2021/0010303 A1 Jan. 14, 2021

(30) Foreign Application Priority Data

Jul. 8, 2019 (FR) ..................................... 19/07620

(51) Int. Cl.

*E05B 79/06* (2014.01)
*E05B 81/76* (2014.01)
*E05B 85/16* (2014.01)

(52) U.S. Cl.

CPC .............. *E05B 79/06* (2013.01); *E05B 81/76* (2013.01); *E05B 85/16* (2013.01)

(58) Field of Classification Search

CPC .......... E05B 79/06; E05B 85/10; E05B 85/16; E05B 81/76; E05B 81/77; E05B 81/78; E05B 81/90; Y10T 292/57; Y10S 292/31

See application file for complete search history.

(56) References Cited

U.S. PATENT DOCUMENTS 6,072,403 A * 6/2000 Iwasaki .............. G07C 9/00309 340/5.72
6,698,262 B2 * 3/2004 Wittwer .................. E05B 77/34 292/DIG. 31
8,342,583 B2 * 1/2013 Stauffer .................. E05B 85/14 292/336.3

(Continued)

FOREIGN PATENT DOCUMENTS

DE 10060547 B4 * 2/2005 ............. E05B 77/06
DE 102015013192 A1 * 4/2016 ............. E05B 41/00

(Continued)

OTHER PUBLICATIONS

Machine translation of EP-0430732-A1 with annotated paragraph numbers (Year: 1990).*

*Primary Examiner* — Christine M Mills
*Assistant Examiner* — Peter H Watson
(74) *Attorney, Agent, or Firm* — Burris Law, PLLC

(57) ABSTRACT

A door leaf handle for a motor vehicle includes a support and a handling element linked to the support through a mechanical linkage, the mechanical linkage being configured to make the handling element movable relative to the support. The handling element includes an external surface turned toward the outside of the passenger compartment of the motor vehicle and an internal surface turned toward the inside of the passenger compartment of the motor vehicle. The door leaf handle includes a detection device configured to detect a pressure exerted on the handling element and, (Continued)

when the pressure is detected, send a signal for opening the door leaf handle to an opening device configured to open the door leaf handle, the detection device being disposed with respect to the handling element on the side of an internal surface and at the level of one end of the handling element.

12 Claims, 4 Drawing Sheets

(56) References Cited

U.S. PATENT DOCUMENTS

| | | | | |
|---|---|---|---|---|
| 8,505,241 | B2 * | 8/2013 | Kusunoki | E05F 15/646 296/146.4 |
| 2001/0005082 | A1 * | 6/2001 | Suparschi | E05B 85/18 292/347 |
| 2002/0046439 | A1 * | 4/2002 | Agostini | E05B 81/76 16/110.1 |
| 2007/0130837 | A1 | 6/2007 | Kusunoki | |
| 2015/0008103 | A1 * | 1/2015 | Seo | E05B 81/76 200/61.62 |
| 2018/0163442 | A1 * | 6/2018 | Soonthornwinate | E05B 79/06 |
| 2020/0392771 | A1 * | 12/2020 | Toyama | E05B 81/06 |

FOREIGN PATENT DOCUMENTS

| | | | | |
|---|---|---|---|---|
| DE | 102016112689 | | 1/2018 | |
| EP | 0430732 | | 6/1991 | |
| EP | 1128005 | A2 * | 8/2001 | E05B 81/78 |
| EP | 3020897 | A1 * | 5/2016 | E05B 1/0038 |
| FR | 2927431 | | 8/2009 | |
| GB | 2506350 | A * | 4/2014 | E05B 5/003 |
| KR | 0162994 | B1 * | 1/1999 | E05B 85/01 |
| WO | 2017198921 | | 11/2017 | |

* cited by examiner

DOOR LEAF HANDLE FOR A MOTOR VEHICLE

CROSS-REFERENCE TO RELATED APPLICATIONS

This application claims priority to and the benefit of FR 19/07620, filed on Jul. 8, 2019. The disclosures of the above applications are incorporated herein by reference.

FIELD

The present disclosure relates to door leaf handles for motor vehicles, and more particularly handles that are flush with the door leaf of a motor vehicle.

BACKGROUND

The statements in this section merely provide background information related to the present disclosure and may not constitute prior art.

There is known a type of motor vehicle door leaf, which is deprived of a mechanical door handle, with the handle being replaced by an electric opening device.

The electrical opening device of the door leaf may be controlled by a contactless interface or by a tactile-type interface with a capacitive or inductive sensor, for example, to enable the user to control opening of the door leaf. Complementarily, to overcome the absence of a mechanical handle, and therefore of a handling element enabling opening of the door leaf, the door leaf is equipped with a motor-driven gap-opening system, or ejection system, which is designed so as to drive the door leaf from a closed position, in which the door leaf is flush with the peripheral frame formed by the bodywork of the vehicle, up to a gap-open position to enable a user to grasp the edge of the door leaf in order to completely open the door leaf.

Different gap-opening systems are known, in particular a system that includes a rack secured to the framework of the vehicle and an actuator secured to the framework of the vehicle and an actuator secured to the door leaf.

The actuator includes a frame which is mounted on the door leaf and a pinion which meshes on the rack, the pinion being driven by an electric motor.

Thus, the rotational drive of the pinion allows driving the displacement of the door leaf between its closed position and a gap-open position.

The rack-based gap-opening system described herein is arranged in the vicinity of the front edge of the door leaf and of the hinge of the door leaf, so as not to impede access to the passenger compartment of the vehicle.

It is also known to provide an automated opening system with an electric cylinder, which includes an electric cylinder including a body mounted on the framework of the vehicle and a movable rod whose free end is mounted on the door leaf. Thus, the cylinder is adapted to drive the door leaf between its closed position and its gap-open position.

The cylinder-based gap-opening system described herein is arranged in the vicinity of the front edge of the door leaf and of the hinge of the door leaf, so as not to impede access to the passenger compartment of the vehicle.

However, this type of handle has several issues.

Indeed, the touch interface allowing opening the door leaf of the vehicle may be activated independently of the user's will.

In addition, this type of handle does not allow using a system for activating opening of the door leaf in compression, when in a flush closure or rest position of the handle.

By flush closure position, it should be understood that the handle is flush with respect to the door leaf of the motor vehicle and, by rest position, it should be understood that the handle is not flush with respect to the door leaf, and is disposed outside the motor vehicle, so that a user could grip it.

Furthermore, the arrangement of these handles does not allow managing the position of the handle in an accurate manner, when the latter is configured to be displaced in different positions, for example from a flush closure or rest position, to a deployed position.

Finally, this type of handle does not provide any solution for opening the door leaf of the vehicle in the event of an electronic failure, the handle remaining flush with the door leaf.

SUMMARY

This section provides a general summary of the disclosure and is not a comprehensive disclosure of its full scope or all of its features.

The present disclosure provides a door leaf handle for a motor vehicle comprising a support and a handling element linked to the support through a mechanical linkage, the mechanical linkage being configured to make the handling element movable relative to the support, the handling element comprising an external surface turned toward the outside of the passenger compartment of the vehicle and an internal surface turned toward the inside of the passenger compartment of the vehicle, the handle comprising a detection device configured to detect a pressure exerted on the handling element and, when a pressure is detected, send a signal for opening the door leaf to an opening device configured to open the door leaf, the detection device being disposed with respect to the handling element on the side of an internal surface and at the level of one end of the handling element.

The handling element extends according to a direction of extension between a first and a second end and delimits a dimension of the handling element. In particular, the direction of extension may be parallel to the door leaf of the vehicle. By the term, at the level of the end, it should be understood that the detection device is disposed at a distance from one end smaller than 30% of the dimension of the handling element.

Hence, the opening signal is intentionally sent by a user, the detection device being enclosed inside the handle. This translates in a pressure exerted on the handling element. Hence, the probability of an unintentional opening is zero, in contrast with a tactile interface where a gentle touch would activate opening of the door leaf. In addition, the detection device being located at the level of one end of the handling element, this allows increasing accuracy with regards to the area for pressure to be exerted on the handling element to activate opening of the door leaf.

According to one form, the mechanical linkage comprises an axis of rotation disposed at the level of one end of the handling element, the detection device being located at the level of the end opposite to that of the axis of rotation.

According to another form, the mechanical linkage comprises at least one lever configured to displace the handling element.

Still according to one form, the detection device comprises an actuation lever configured to be in contact and abutment, on the one hand, with the handling element and, on the other hand, with an electric sensor configured to generate the opening signal, in a flush closure or rest position of the handle.

This arrangement of the detection device allows using this device in compression, whether in the inactivation position, corresponding to the flush closure or rest position of the handle, and more specifically of the handling element, and in the activation position of the device, corresponding to an inclined position of the handle, and more specifically of the handling element, with respect to the door leaf.

In particular, the actuation lever comprises a first branch configured to be in contact and abutment with the handling element and a second branch configured to be in contact and abutment with the electric sensor, when a predetermined pressure is exerted on the handling element.

Still particularly, the handle comprises a linkage between the handling element and the first branch formed by a contact surface and a contact point wherein the contact point is configured to be displaced transversely relative to the contact surface, when a pressure is exerted on the handling element, the contact surface being formed on the first branch, respectively on the handling element, and the contact point being formed on the handling element, respectively on the first branch.

In one variant, the contact surface is formed in a bottom of a cavity. In particular, the cavity has a U-like rounded or square shape, the contact point having a shape complementary with the shape of the cavity.

The U-like square shape enables a contact with a planar surface of the cavity and offers the possibility of varying the distance between the portion of the lever and the axis of rotation of the actuation lever without affecting the position of the handling element according to a transverse axis, corresponding to the direction of extraction of the handling element.

In another variant, the contact surface is configured to be parallel to the direction of extension of the handling element or inclined with respect to the direction of extension of the handling element.

The inclination of the cavity enables the handling element to adapt to the variations of distance between the portion of the lever and the axis of rotation of the actuation lever that might exist in different handles.

In one form, the actuation lever is configured to be detached from the electric sensor when a predetermined pressure is exerted on the handling element, on an electronic opening area of the external surface of the handling element, the electric sensor being configured to generate the opening signal during the displacement of the actuation lever.

According to one possibility, the detection device comprises an actuation lever configured to be in contact and abutment, on the one hand, with the handling element and, on the other hand, with an electric sensor configured to generate the opening signal, in an activation position.

This arrangement allows using the detection device in relaxation, which is an alternative to the detection device in compression.

According to another possibility, the handling element is movable between a flush closure position and a deployed position in which it can be manually actuated so as to be displaced afterward to an opening position of the door leaf to mechanically open the door leaf, the handling element being displaced from the flush closure position to the deployed position by a pressure exerted on a mechanical opening area of the external surface of the handling element, the mechanical and electronic opening areas being distinct from one another.

These forms of the present disclosure offer the possibility of mechanically opening the door leaf. In the event of an electronic failure, access to the vehicle is still possible.

According to still another possibility, the mechanical and electronic opening areas are located on the handling element so that a pressure exerted on the electronic opening area causes a displacement of the handling element in a first direction and a pressure exerted on the mechanical opening area causes a displacement of the handling element in a second direction, distinct from the first direction.

According to yet another possibility, the displacement of the handling element, when a pressure is exerted on the mechanical or electronic opening area, is a rotation, the second direction of displacement being a rotation reverse to the first direction of displacement.

In one form, the handling element is linked to the support through one single mechanical linkage to which it is pivotally connected so that the handling element is movable in rotation relative to the mechanical linkage, the electronic opening area being shifted from the pivot connection area.

In another form, the support comprises a handling element stop configured to block a movement of the handling element toward the outside of the motor vehicle.

In yet another form, the handling element is linked to the support through the mechanical linkage, the mechanical linkage comprising two levers, the handling element being linked to the first lever through a first pivot connection and to the second lever through a second pivot connection.

In still another form, the detection device is located outside the space delimited between the first and second pivot connections.

This arrangement of the detection device with respect to the handling element allows increasing accuracy with regards to the area for pressure to be exerted on the handling element to actuate opening of the door leaf.

In at least one form, the support comprises stops, a lever stop being disposed against the at least one lever disposed at the level of the end of the handling element, turned toward the passenger compartment of the vehicle and an actuation lever stop being disposed on the second branch of the actuation lever, turned toward the outside of the vehicle.

These stops allow managing the position of the handle in an accurate manner. Indeed, since the handling element is configured to take on different positions, each position will remain the same throughout the service life of the handle thanks to these stops. According to one variant, the first lever comprises an orifice and the second lever comprises an oblong hole, the two levers being linked to one another by at least one tie-rod, the at least one tie-rod being parallel to the oblong hole.

The tie-rod allows coupling the two levers so that when the handling element is displaced, the two levers are displaced according to a movement of the handling element.

In another variant, the mechanical opening area is disposed on the external surface of the handling element disposed between the first pivot connection and the second pivot connection.

According to still another variant, the electronic opening area is located opposite to the mechanical opening area with respect to the position of the first pivot connection.

The two mechanical and electronic opening areas being distinct from one another, the user is therefore free to open the door leaf of the vehicle mechanically or electrically.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
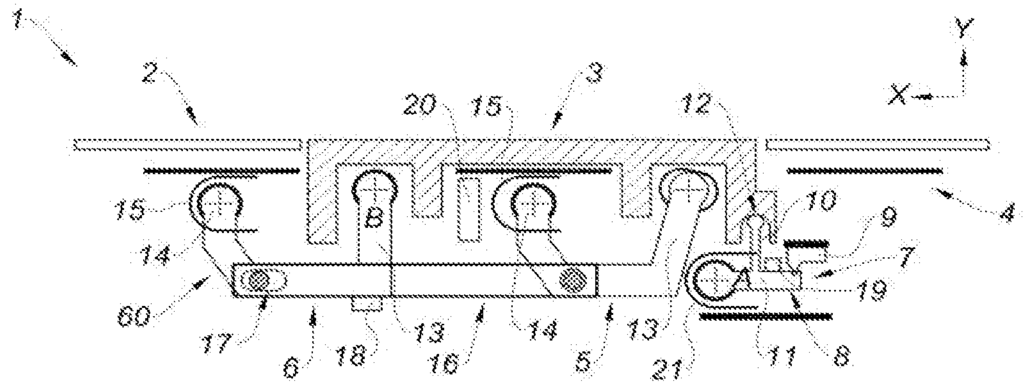
FIG. 1A represents a sectional view according to a longitudinal axis, of a handle in the position flush with the door leaf, in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1A shows a handle 1 in a position flush with a door leaf 2, for example of a motor vehicle. The flush position is a closure position of the handle 1.

The handle 1 comprises a handling element 3. This handling element 3 is flush with the door leaf 2.

The handle 1 also comprises a support 4 to which the handling element 3 is linked, through a mechanical linkage 60, comprising two levers 5 and 6.

These levers 5 and 6 are configured to displace the handling element 3 according to a rotational movement.

The handle 1 also comprises a detection device 7 including an actuation lever 8 rotatable about an axis A, comprising a torsion spring 21, and an electric sensor 9. This detection device 7 is located at the level of one end of the handling element 3.

In the position of the handle 1 flush with the door leaf 2, the actuation lever 8 is in contact and abutment, on the one hand, with one end of the handling element 3 and, on the other hand, with the electric sensor 9.

More specifically, the actuation lever 8 comprises a first branch 10 disposed radially outward of the vehicle and a second branch 11 disposed radially according to the longitudinal axis X. The first branch 10 of the actuation lever 8 is received within a cavity 12 of the handling element 3, this cavity 12, with a U-like rounded shape, being located in the continuation of one end of the handling element 3 directed toward the passenger compartment of the vehicle. The second branch 11 is in contact and abutment with the electric sensor 9, the electric sensor 9 being closer to the door leaf 2 than the second branch 11.

The first branch 10 has a shape complementary with the shape of the cavity 12, so that the first branch 10 fits into the cavity 12 until abutting against the latter, at the level of a contact surface of the cavity, thereby defining a contact point between the cavity 12 and the first branch 10 of the actuation lever 8.

A non-represented element may be interposed between the first branch 10 of the actuation lever 8 and the cavity 12 of the handling element, reducing noise and wear during the contact between the first branch 10 and the cavity 12.

Each lever 5 and 6 has a first portion 13 fastened to the handling element 3 through a pivot connection and a second portion 14 fastened to the support 4.

The second portion 14 is in pivot connection between the support 4 and the handling element 3. This second portion 14 comprises a torsion spring 15.

These first and second levers 5 and 6 have a bent shape.

The second portion 14 of the first lever 5 is linked to an area of the support 4 located opposite the handling element 3. The second portion 14 of the second lever 6 is linked to an area of the support 4 shifted from the handling element 3.

A tie-rod 16 couples the two levers 5 and 6. This coupling is achieved at the level of the ends of the tie-rod 16.

Indeed, each end of the tie-rod 16 is in a hinged connection with corresponding levers 5 and 6, where one of the hinged connections has an oblong hole 17, disposed parallel to the tie-rod 16.

The tie-rod 16 allows displacing the first and second levers 5 and 6, relative to one another, in accordance with the displacement of the handling element 3.

Indeed, the oblong hole 17 thereby confers a clearance for the tie-rod 16 according to a longitudinal direction of the tie-rod 16.

Hence, the forces transmitted by the tie-rod 16 are exerted in a balanced manner on both the second lever 6 and the first lever 5 so that the risk of jamming is reduced.

A lever stop 18 is disposed against the second lever 6 and turned toward the passenger compartment of the vehicle and an actuation lever stop 19 is disposed against the second branch 11 of the actuation lever 8, turned toward the outside of the vehicle. These stops allow determining and managing the position of the handle 1 in an accurate manner.

Indeed, as regards the actuation lever stop 19, it is the torsion spring 21 of the actuation lever 8 that is actually configured to push the actuation lever 8, and more particularly its second branch 11 against the actuation lever stop 19.

A lock 20 is positioned between the first lever 5 and the second lever 6.

Figure 1B:
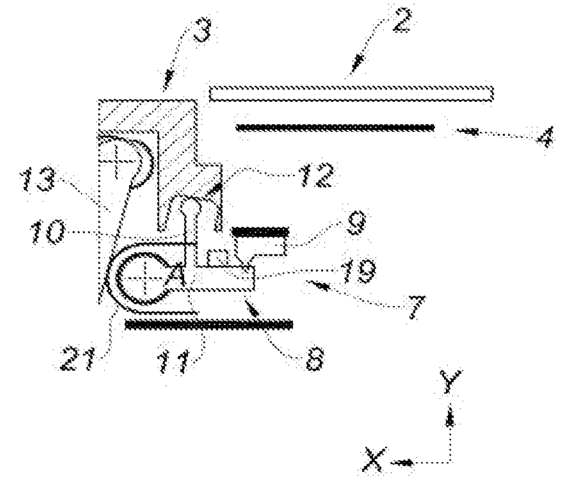
FIG. 1B represents a sectional view according to a longitudinal axis, of the cavity receiving the detection device, according to a form of the present disclosure.
Figure 1C:
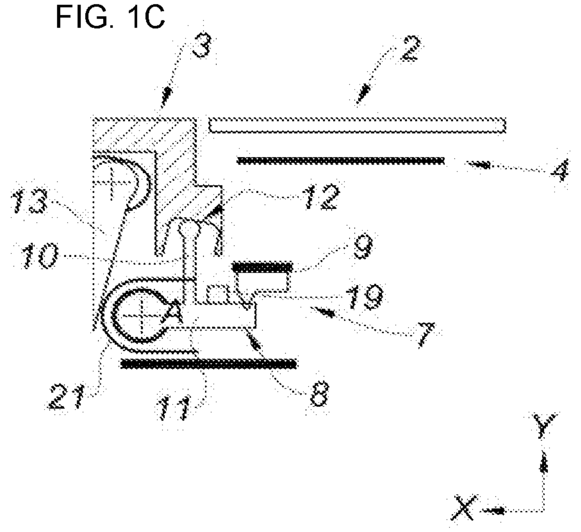
FIG. 1C represents a sectional view according to a longitudinal axis, of the cavity receiving the detection device, according to another form of the present disclosure.

According to still another form of the present disclosure represented in FIGS. 1B and 1C, the cavity 12 may be inclined with respect to the longitudinal axis X of the direction of extension of the handling element 3. The inclination of the cavity 12 enables the handling element 3 to adapt to the distance between the first portion 13 of the second lever 6 and the axis of rotation A of the actuation lever 8. Indeed, this distance may vary depending on the handle.

When the distance increases between the first portion 13 of the second lever 6 and the axis of rotation A of the actuation lever 8, represented in FIG. 1B, the handling element 3 is disposed toward the inside of the passenger compartment of the vehicle, with respect to the door leaf 2.

When the distance decreases between the first portion 13 of the second lever 6 and the axis of rotation A of the actuation lever 8, represented in FIG. 1C, the handling element 3 is disposed toward the outside of the passenger compartment of the vehicle, with respect to the door leaf 2.

Figure 2:
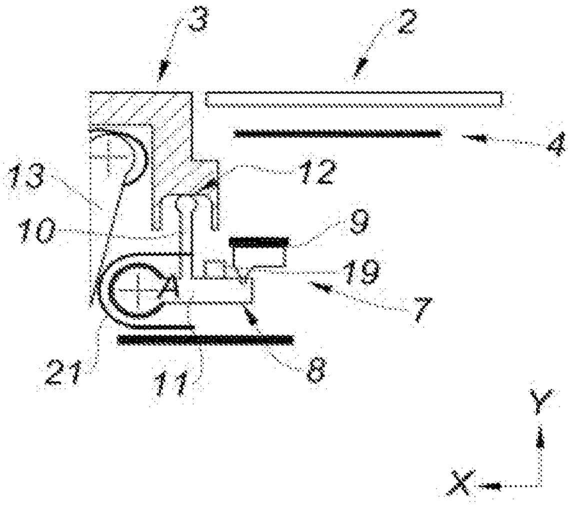
FIG. 2 represents a sectional view according to a longitudinal axis, of the cavity receiving the detection device, according to another form of the present disclosure.

FIG. 2 shows another form of the present disclosure. The cavity 12 has a U-like square shape. The U-like square shape enables a contact of the first branch 10 of the actuation lever 8 with a planar surface of the cavity 12 according to the longitudinal axis X, and offers the possibility of varying the distance between the first portion 13 of the second lever 6 and the axis of rotation A of the actuation lever 8 without affecting the position of the handling element 3 according to the transverse axis Y, corresponding to the direction of extraction of the handling element 3.

Figure 3:
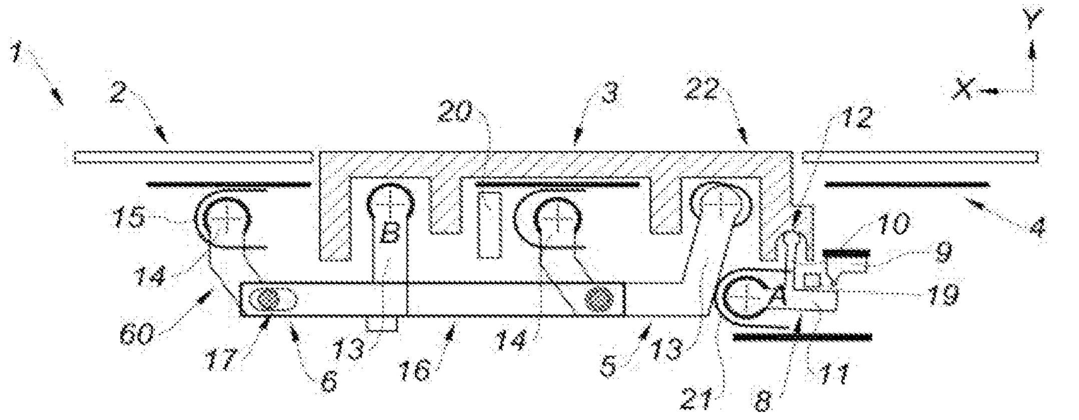
FIG. 3 represents a sectional view according to a longitudinal axis, of a handle in an electronic opening position of the door leaf, in accordance with the present disclosure.

FIG. 3 shows the handle 1, whose handling element 3 is no longer in the flush position with respect to the door leaf 2.

Indeed, the handling element 3 is slightly inclined with respect to the door leaf 2.

Therefore, the second branch 11 of the actuation lever 8 is detached from the electric sensor 9, the actuation lever 8 is the in an activation position.

The handling element 3 has performed a rotational movement toward the inside of the passenger compartment of the vehicle, via the first portion 13 of the second lever 6.

This displacement of the handling element 3 is due to a pressure, in the range of ten Newtons, exerted on an electronic opening area 22 disposed on the external face of the handling element 3.

More specifically, this electronic opening area 22 is located downstream of the axis of rotation according to the longitudinal axis X of the handle 1, of the second portion 14 of the first lever 5.

Figure 4:
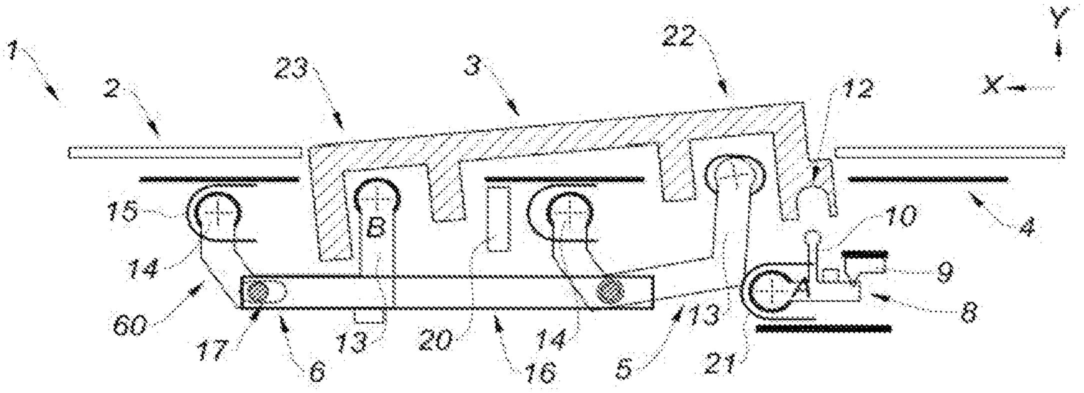
FIG. 4 represents a sectional view according to a longitudinal axis, of a handle in a deployed position, in accordance with the present disclosure.

FIG. 4 shows the handle 1 in the deployed position.

This deployed position is reached in the reverse direction of the position of the handle 1 shown in FIG. 2.

This displacement of the handling element 3 is due to a pressure, in the range of twenty-five Newtons, exerted on the mechanical opening area 23 disposed on the external face of the handling element 3.

The mechanical opening area 23 for displacing the handling element 3 in the deployed position is different from the electronic opening area 22.

Indeed, the mechanical opening area 23 is disposed upstream of the axis of rotation according to the longitudinal axis X of the handle 1, of the second portion 14 of the first lever 5.

In other words, the mechanical opening area 23 is located between two pivot connections of the first and second levers 5 and 6, namely between the second portions 14 of each lever 5 and 6.

This deployed position of the handle 1 is reflected by the detachment from the cavity 12 of the first branch 10 of the actuation lever 8 by rotation of the second portion 14 of the first lever 5.

The electronic opening area 22 is located opposite to the mechanical opening area 23.

This deployed position is configured to provide access to the lock 20 enabling unlocking of the door leaf 2 of the motor vehicle, by a suitable key, for example in the event of an electrical failure of the latter.

Figure 5:
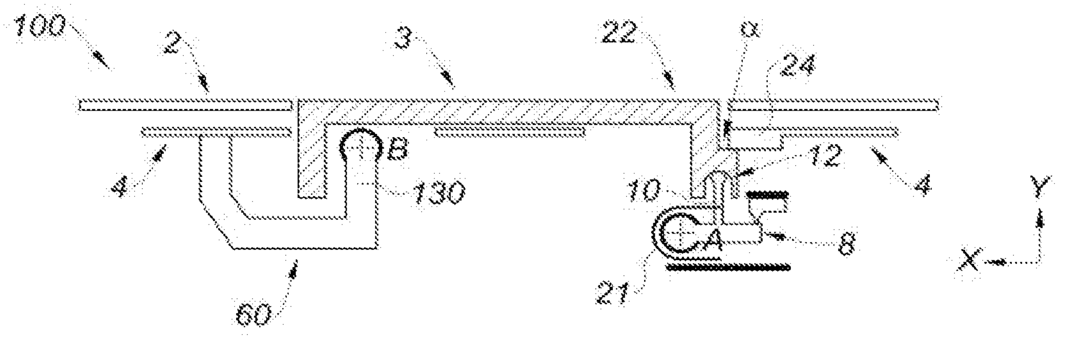
FIG. 5 represents a sectional view according to a longitudinal axis, of a handle in a position flush with the door leaf, according to another form of the present disclosure.

FIG. 5 shows a handle 100 according to a second form of the present disclosure.

Unlike the previously-described handle 1, the latter includes only one mechanical linkage 60.

This mechanical linkage 60 is an integral part of the support 4. In this second form, the axis of rotation B of the mechanical linkage 60 is located on its first portion 130.

Consequently, this handle 100 is not configured to adopt a deployed position.

A handling element stop 24 blocks the handling element 3 at the level of its end comprising the cavity 12 receiving the first branch 10 of the actuation lever 8. This handling element stop 24 allows keeping an accurate position of the handling element 3 of the handle 100.

More specifically, the handling element stop 24 abuts against a right angle α formed by the end of the handling element 3 comprising the cavity 12.

In other words, the handling element 3 is accommodated and abutting between the handling element stop 24 and the first branch 10 of the actuation lever 8.

It is the torsion spring 21 of the actuation lever 8 that is actually configured to push the actuation lever 8, and more particularly its first branch 10 against the cavity 12 of the handling element 3 thereby urging the handling element 3 to abut against the handling element stop 24.

The handle 100 is adapted for a door leaf 2 located on a passenger side of the motor vehicle.

Hence, the electronic opening area 22 is located downstream of the first portion 130 of the mechanical linkage 60.

This second form does not include any mechanical opening area.

Figure 6:
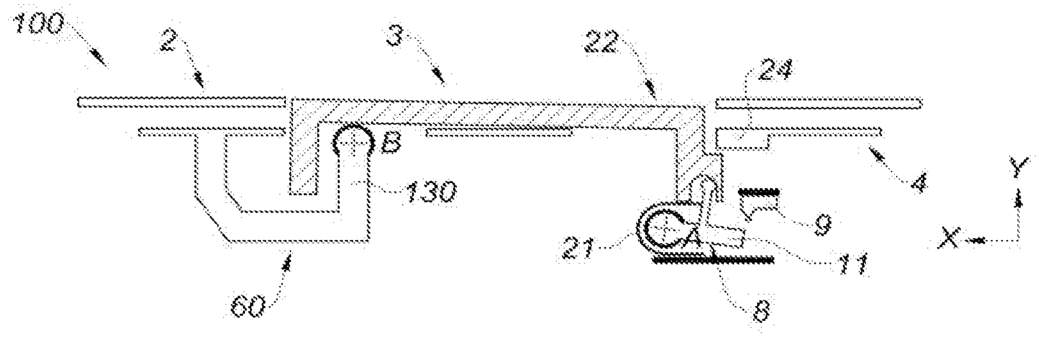
FIG. 6 represents a sectional view according to a longitudinal axis, of a handle according to FIG. 4, in an electronic opening position of the door leaf.

FIG. 6 shows the handle 100 according to the second form, in an electronic opening position of the door leaf 2.

Indeed, the handling element 3 is slightly inclined with respect to the door leaf 2.

Therefore, the second branch 11 of the actuation lever 8 is detached from the electric sensor 9.

The handling element 3 has performed a rotational movement toward the inside of the passenger compartment of the vehicle, via the first portion 130 of the mechanical linkage 60.

This displacement of the handling element 3 is due to a pressure, in the range of ten Newtons, exerted on the electronic opening area 22 disposed on the external face of the handling element 3.

Hence, the handling element 3 is no longer abutting against the handling element stop 24.

Figure 7:
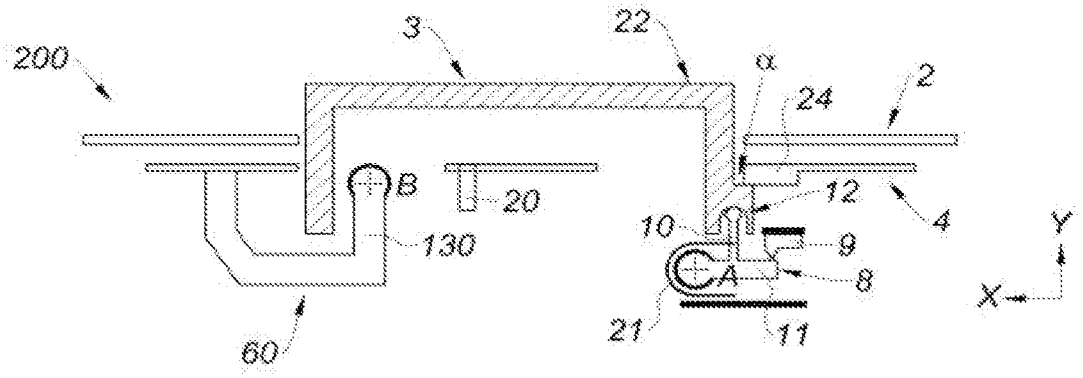
FIG. 7 represents a sectional view according to a longitudinal axis, of a handle in a rest position, according to another form of the present disclosure.

FIG. 7 shows a handle 200 according to a third form of the present disclosure. This handle 200 is in the rest position. In other words, it is a conventional handle, that is not flush with the door leaf 2 in the closure position. Hence, the handling element 3 is disposed outside the vehicle, so that the user could grip it. Hence, a lock 20 is accessible, enabling the user to unlock the door leaf 2 using a suitable key.

Unlike the first form, the handle 1, 100 comprises one single mechanical linkage 60 and includes only one electronic opening area 22.

Figure 8:
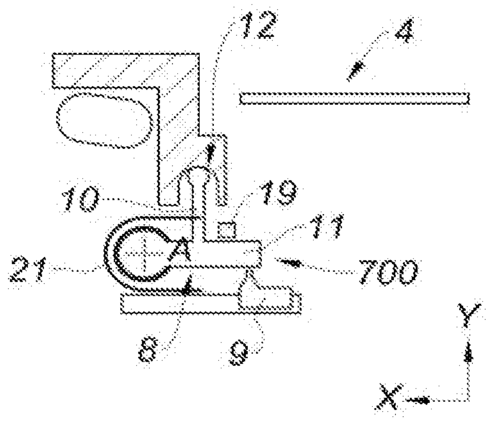
FIG. 8 represents a sectional view according to a longitudinal axis, of a detection device with a handle in a position flush with the door leaf, according to another form of the present disclosure.

FIG. 8 shows a detection device 700 according to another form, of a handle 1, 100, 200 in a position flush with the door leaf 2.

Unlike the first, second and third forms, the electric sensor 9 is disposed on the opposite side of the second branch 11 of the actuation lever 8, in comparison with the position of the electric sensor 9 of the first, second and third forms of the present disclosure.

In other words, the electric sensor 9 is located closer to the passenger compartment than the second branch 11 of the actuation lever 8.

This is reflected by a detection device 700 operating in relaxation, in contrast with the first, second and third forms, in which the detection device 7 operates in compression, when in the position flush with the door leaf 2 or rest position, of the handle 1, 100, 200.

It should be noted that in this form, the second branch 11 of the actuation lever 8 is no longer in contact with the electric sensor 9.

Figure 9:
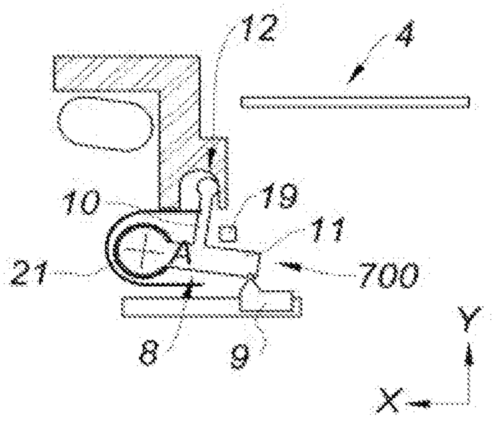
FIG. 9 represents a sectional view according to a longitudinal axis, of the detection device according to FIG. 8, of a handle in an electronic opening position of the door leaf.

FIG. 9 shows the detection device 700 according to the form of FIG. 8, of a handle 1, 100, 200 in an electronic activation position of the door leaf 2.

The handling element 3 has performed a rotational movement toward the inside of the passenger compartment of the vehicle, through the rotation of the first portion 13 of the second lever 6 for the first form of the present disclosure, or of the first portion 130 of the mechanical linkage 60 for the second and third forms of the present disclosure.

Therefore, the second branch 11 of the actuation lever 8 is in contact with the electric sensor 9.

The different forms represented in the figures present rotatably movable handles. According to another form, which is not represented, the handle 1, 100, 200 may be movable in translation.

In the following paragraphs, the operation of the present disclosure is explained, firstly with reference to the first form.

When the handle 1 is in the position flush with the door leaf 2 of the motor vehicle, the detection device 7, and more specifically the actuation lever 8 is in contact and abutment against both the handling element 3 and the electric sensor 9.

Even more specifically, it is the first branch 10 of the actuation lever 8 that is actually abutting against the end of the handling element 3 including the cavity 12 and the second branch 11 of the actuation lever 8 which is abutting against the electric sensor 9.

A user can exert a pressure in the electronic opening area 22 of the handling element 3, in order to displace the handling element 3 so that this handling element 3 displaces the actuation lever 8 into the activation position, which, in turn, detaches from the electric sensor 9.

When the electric sensor 9 is relaxed by the second branch 11 of the actuation lever 8, it sends a signal for opening the door leaf 2 to an opening device of the door leaf 2.

This opening device allows opening the door leaf 2 of the motor vehicle, for example by a door leaf 2 ejection system.

It should be noted that the opening device may also lower a glass of the door leaf 2.

Finally, once the door leaf 2 is open, the handling element 3 returns back to its initial position, that is in the position flush with the door leaf 2, by the torsion spring 15. The same applies to the actuation lever 8 which returns back to its initial position, by the torsion spring 21.

When the motor vehicle undergoes an electrical failure, the door leaf 2 cannot be opened by the previously described device.

To remedy this, the user exerts a pressure in the mechanical opening area 23 of the handling element 3, displacing the handling element 3 in a deployed position.

This deployed position enables access to the lock 20, enabling the user to unlock the door leaf 2 using a suitable key.

Once the door leaf 2 is unlocked, the user manually pulls on the handling element 3, thereby opening the door leaf 2.

According to the second and third forms and unlike the first form, the handle 100, 200 does not include an opening mode through a pressure exerted in the mechanical opening area 23.

According to the form comprising the detection device 700 and unlike the first form, when a user exerts a pressure in the electronic opening area 22 of the handling element 3 so that this handling element 3 displaces the actuation lever 8, which, in turn, comes into contact with the electric sensor 9 via its second branch 11, the sensor detects the pressure exerted in the electronic opening area 22 and sends a signal for opening the door leaf 2 to an opening device of the door leaf 2.

Of course, all simple modifications or combination of elements derived from different variants of the present disclosure fall within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A door leaf handle for a door leaf of a motor vehicle comprising a support and a handling element linked to the support through a mechanical linkage, the mechanical linkage being configured to make the handling element movable relative to the support, the handling element comprising an external surface turned toward the outside of a passenger compartment of the motor vehicle and an internal surface turned toward the inside of the passenger compartment of the motor vehicle, the door leaf handle comprising a detection device configured to detect a pressure exerted on the external surface of the handling element and, when the pressure is detected, send a signal for opening the door leaf to an opening device configured to open the door leaf, the detection device being disposed with respect to the handling element on a side of the internal surface and at a level of one end of the handling element, wherein the detection device comprises an actuation lever and an electric sensor, the actuation lever being configured to be in contact and abutment with the handling element and with the electric sensor configured to generate the opening signal, in a flush closure or rest position of the door leaf handle, wherein the actuation lever is configured to be detached from the electric sensor when a predetermined pressure is exerted on the handling element, on an electronic opening area of the external surface of the handling element, the electric sensor being configured to generate the opening signal during displacement of the actuation lever, and wherein the handling element is movable between a flush closure position and a deployed position in which the handling element can be manually actuated to be displaced afterward to an opening position of the door leaf handle to mechanically open the door leaf handle, the handling element being displaced from the flush closure position to the deployed position by a pressure exerted on a mechanical opening area of the external surface of the handling element, the mechanical and electronic opening areas being distinct from one another and the electronic opening area being located opposite the mechanical opening area with respect to the position of a first pivot connection, wherein the actuation lever is configured to remain attached to the electrical sensor in response to the pressure exerted on the mechanical opening area displacing the handling element from the flush closure position to the deployed position, wherein the mechanical and electronic opening areas are located on the handling element and the pressure exerted on the electronic opening area causes a displacement of the handling element in a first direction and the pressure exerted on the mechanical opening area causes a displacement of the handling element in a second direction, distinct from the first direction, wherein the deployed position is configured to provide access to a lock that is not accessible in the flush closure position, the lock being configured to permit unlocking of the door leaf by a corresponding key.

2. The door leaf handle according to claim 1, wherein the mechanical linkage comprises an axis of rotation disposed at the level of one end of the handling element, the detection device being located at a level of an end opposite to that of the axis of rotation.

3. The door leaf handle according to claim 1, wherein the mechanical linkage comprises at least one lever configured to displace the handling element.

4. The door leaf handle according to claim 1, wherein the actuation lever comprises a first branch configured to be in contact and abutment with the handling element and a second branch configured to be in contact and abutment with the electric sensor, when the predetermined pressure is exerted on the handling element.

5. The door leaf handle according to claim 4, comprising a linkage between the handling element and the first branch formed by a contact surface and a contact point wherein the contact point is configured to be displaced transversely relative to the contact surface, when the predetermined pressure is exerted on the handling element, the contact surface being formed on the first branch, respectively on the handling element, and the contact point being formed on the handling element, respectively on the first branch.

6. The door leaf handle according to claim 1, wherein the actuation lever is configured to be in contact and abutment with the handling element and with the electric sensor configured to generate the opening signal, in an activation position.

7. The door leaf handle according to claim 1, wherein the displacement of the handling element, when the pressure is exerted on the mechanical or electronic opening area, is a rotation, the second direction of displacement being a rotation reverse to the first direction of displacement.

8. The door leaf handle according to claim 1, wherein the handling element is linked to the support through one single mechanical linkage to which the handling element is pivotally connected and the handling element is movable in rotation relative to the mechanical linkage, the electronic opening area being shifted from the pivot connection.

9. The door leaf handle according to claim 1, wherein the support comprises a handling element stop configured to block a movement of the handling element toward the outside of the motor vehicle.

10. The door leaf handle according to claim 1, wherein the handling element is linked to the support through the mechanical linkage, the mechanical linkage comprising two levers, the handling element being linked to a first lever of the two levers through a first pivot connection and to a second lever of the two levers through a second pivot connection.

11. The door leaf handle according to claim 10, wherein the detection device is located outside a space delimited between the first and second pivot connections.

12. The door leaf handle according to claim 1, wherein the support comprises stops, a lever stop being disposed against at least one lever disposed at the level of one end of the handling element, turned toward the passenger compartment of the motor vehicle and an actuation lever stop being disposed on a second branch of the actuation lever, turned toward the outside of the motor vehicle.

* * * * *